(12) United States Patent
 Hayashi et al.

(10) Patent No.: US 11,134,158 B2
(45) Date of Patent: Sep. 28, 2021

(54) INFORMATION PROCESSING APPARATUS AND NON-TRANSITORY COMPUTER READABLE MEDIUM FOR ACQUIRING AND STORING ADDITIONAL PROCESSING PROGRAM

(71) Applicant: FUJIFILM BUSINESS INNOVATION CORP., Tokyo (JP)

(72) Inventors: Terutake Hayashi, Kanagawa (JP); Shunji Tsunashima, Kanagawa (JP); Nobukazu Miyoshi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/847,757

(22) Filed: Apr. 14, 2020

(65) Prior Publication Data

US 2021/0185179 A1   Jun. 17, 2021

(30) Foreign Application Priority Data

Dec. 13, 2019   (JP) .............................. JP2019-225459

(51) Int. Cl.
 *H04N 1/00* (2006.01)
 *G06F 9/48* (2006.01)
(52) U.S. Cl.
 CPC ........... *H04N 1/00066* (2013.01); *G06F 9/48* (2013.01); *H04N 1/0009* (2013.01);
 (Continued)
(58) Field of Classification Search
 CPC ........... H04N 1/00084; H04N 1/00938; H04N 1/00962; H04N 1/00002; H04N 1/00029; H04N 1/00037; H04N 1/00039; H04N 1/00055; H04N 1/00058; H04N 1/00061; H04N 1/00063; H04N 1/00066; H04N 1/00082; H04N 1/32545; G06F 3/1225; G06F 3/123; G06F 3/1234; G06F 3/1255; G06F 3/126; G06F 3/1261; G06F 3/1291; G06F 2206/1506; G06F 2206/1508; G06K 15/1821; G06K 15/1822; G06K 15/1823; G06K 15/1825; G06K 15/1836; G06K 15/184; G06K 15/1859; G06K 15/186; G06K 15/1861; G06K 15/1865;
 (Continued)

(56) References Cited

U.S. PATENT DOCUMENTS

2001/0027518 A1\* 10/2001 Koshikawa ........... G06F 9/4415
  713/2
2007/0043971 A1\* 2/2007 Suzuki ............... H04N 1/00037
  714/11
(Continued)

FOREIGN PATENT DOCUMENTS

JP   2010-109721 A   5/2010
JP   2018-196091 A   12/2018

*Primary Examiner* — Scott A Rogers
(74) *Attorney, Agent, or Firm* — Oliff PLC

(57) ABSTRACT

An information processing apparatus includes a processor configured to acquire an additional processing program for performing additional processing in response to a connection of an additional processing apparatus configured to perform the additional processing for a function of the information processing apparatus, and store the acquired additional processing program in the information processing apparatus.

8 Claims, 11 Drawing Sheets

(52) U.S. Cl.
CPC ..... *H04N 1/00037* (2013.01); *H04N 1/00084* (2013.01); *H04N 1/00938* (2013.01)

(58) Field of Classification Search
CPC ............. G06K 15/4005; G06K 15/401; G06K 15/402; G06K 2215/0085
See application file for complete search history.

(56) References Cited

U.S. PATENT DOCUMENTS

| | | | | |
|---|---|---|---|---|
| 2009/0231612 | A1* | 9/2009 | Matsushita | H04N 1/00347 358/1.15 |
| 2012/0066083 | A1* | 3/2012 | Inoue | G06Q 30/0601 705/26.1 |

* cited by examiner

FIG. 3

| MAIN PROCESSING | DETAILS OF PROCESSING | PRIORITY |
|---|---|---|
| SCAN PROCESSING | IMAGE READING PROCESSING | 1 |
| | HIGH COMPRESSION PROCESSING | 1 |
| | HIGH IMAGE QUALITY PROCESSING | 1 |
| | STORAGE PROCESSING | 1 |
| PRINT PROCESSING | PRINT PREPROCESSING | 3 |
| | PRINT OUTPUT PROCESSING | 3 |

FIG. 5

| MAIN PROCESSING | DETAILS OF PROCESSING | PRIORITY |
|---|---|---|
| SCAN PROCESSING | IMAGE READING PROCESSING | 1 |
| | HIGH COMPRESSION PROCESSING | 2 |
| | HIGH IMAGE QUALITY PROCESSING | 2 |
| | STORAGE PROCESSING | 2 |
| PRINT PROCESSING | PRINT PREPROCESSING | 3 |
| | PRINT OUTPUT PROCESSING | 3 |

FIG. 7

| MAIN PROCESSING | DETAILS OF PROCESSING | PRIORITY |
|---|---|---|
| COPY PROCESSING | IMAGE READING PROCESSING | 1 |
| | HIGH IMAGE QUALITY PROCESSING | 1 |
| | PRINT OUTPUT PROCESSING | 1 |
| PRINT PROCESSING | PRINT PREPROCESSING | 3 |
| | PRINT OUTPUT PROCESSING | 3 |

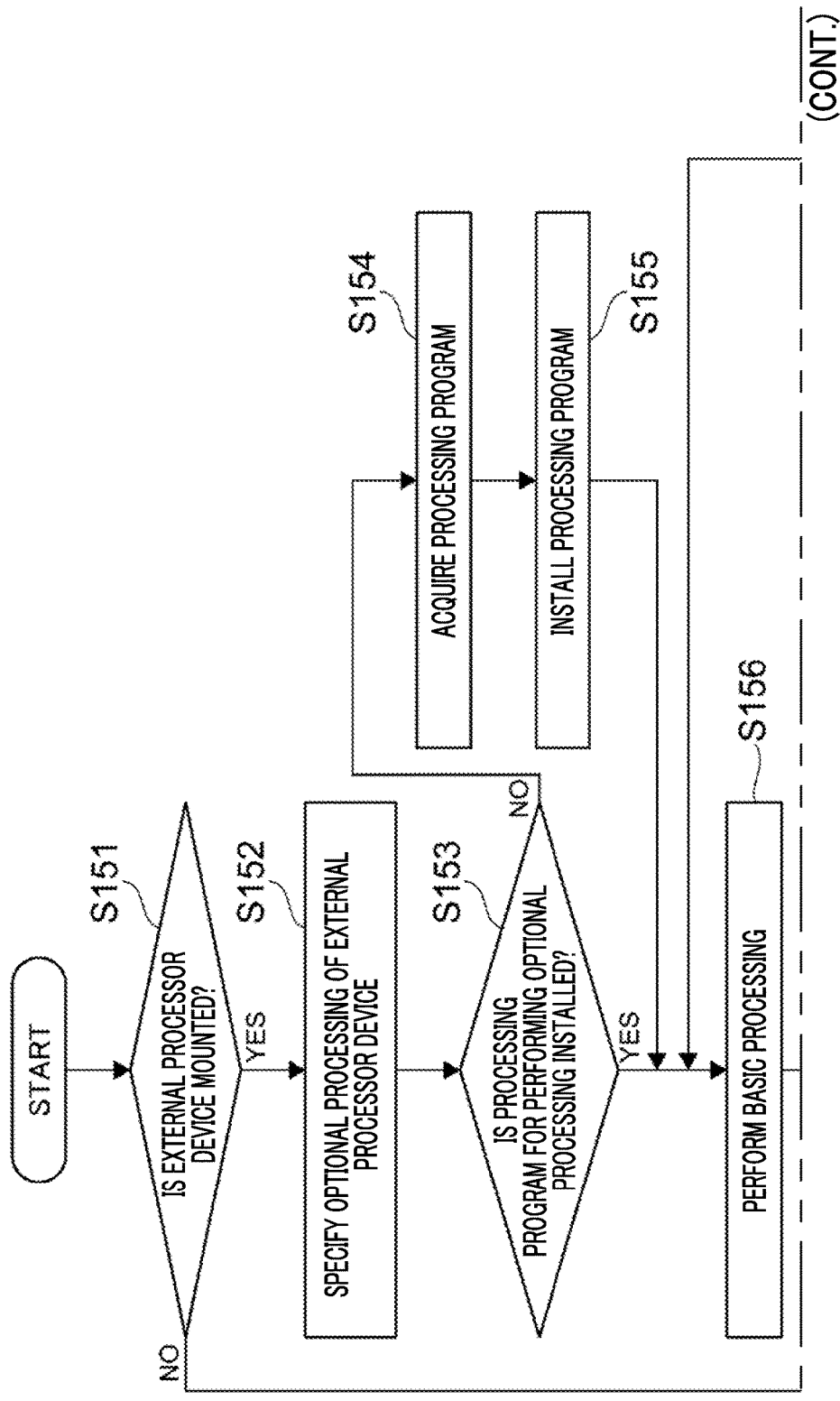

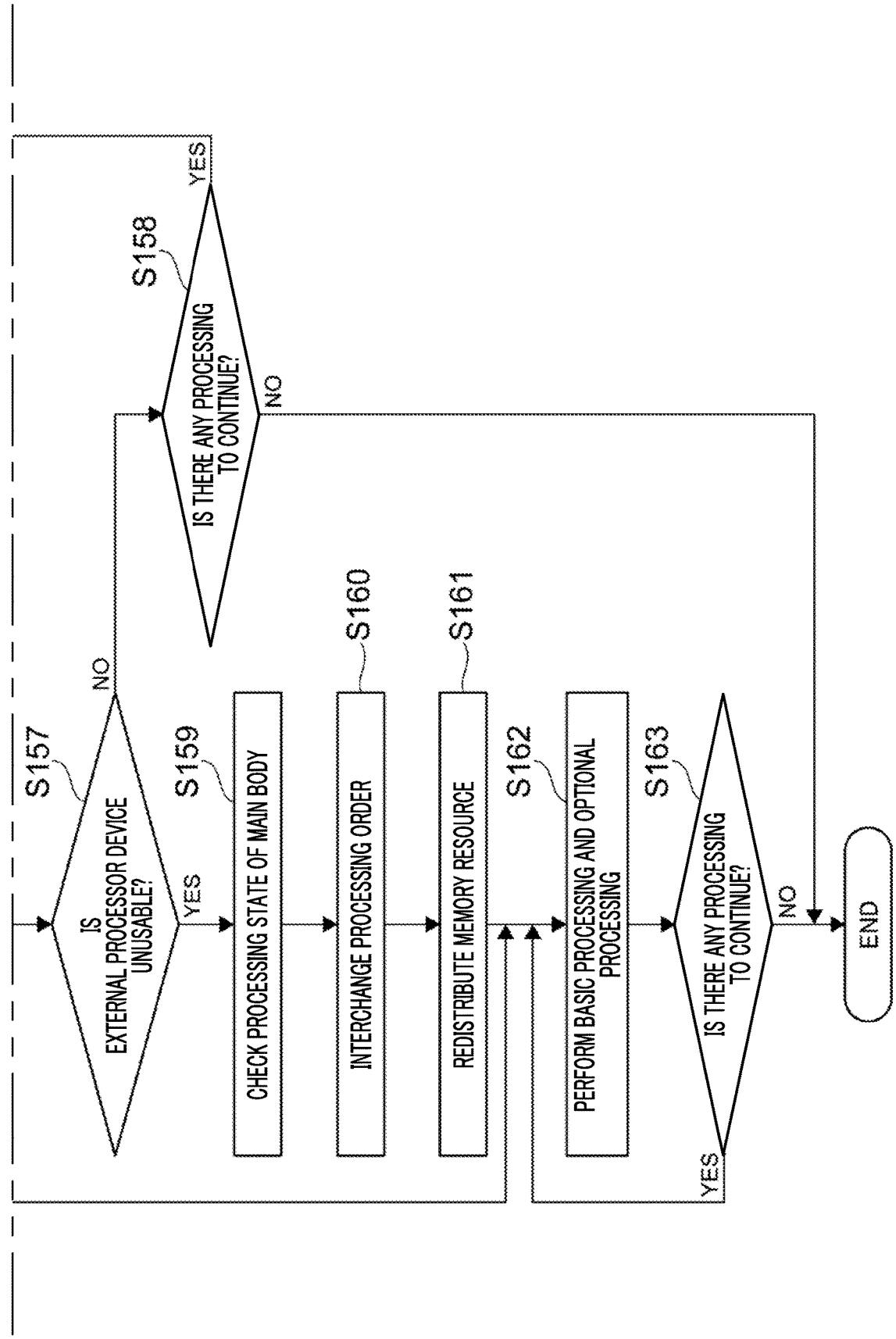

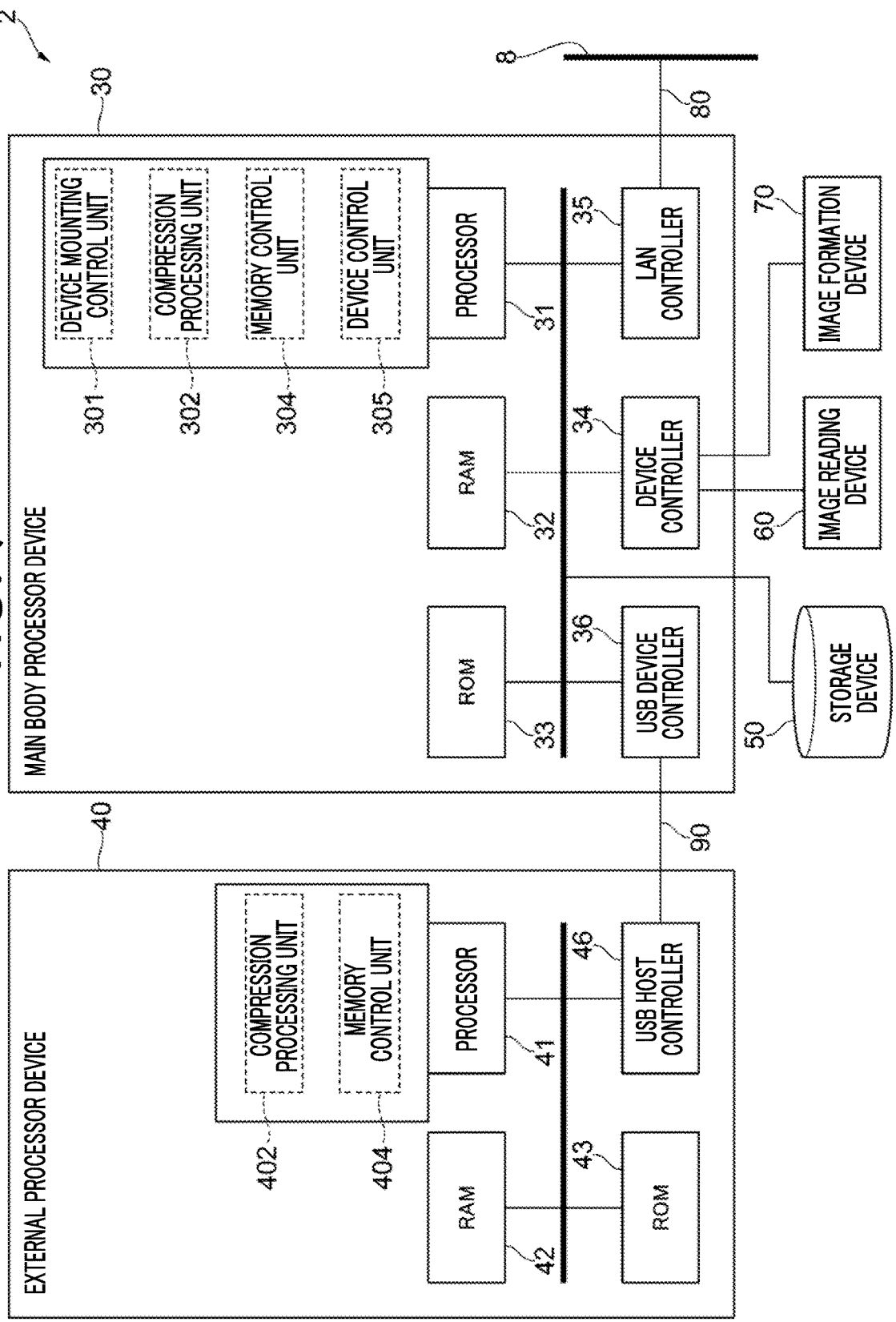

INFORMATION PROCESSING APPARATUS AND NON-TRANSITORY COMPUTER READABLE MEDIUM FOR ACQUIRING AND STORING ADDITIONAL PROCESSING PROGRAM

CROSS-REFERENCE TO RELATED APPLICATIONS

This application is based on and claims priority under 35 USC 119 from Japanese Patent Application No. 2019-225459 filed Dec. 13, 2019.

BACKGROUND

1. Technical Field

The present disclosure relates to an information processing apparatus and a non-transitory computer readable medium.

2. Related Art

A management apparatus is known which receives, from a multifunction device, a type of an error occurred when performing setting processing of a function of the multifunction device including a function for using a device to be mounted on the multifunction device, refers to a first table in which a type of an error of the multifunction device is associated with content of temporal processing that is setting processing for avoiding the error in a first correspondence table created to correspond to a function of the multifunction device to be set, determines the content of the temporal processing based on the type of received error, and transmits the content of the determined temporal processing to the multifunction device (see, for example, JP-A-2018-196091).

An image processing system is known in which a multifunction device A transmits release information to a multifunction device B as release information for temporarily releasing a use restriction of a function by another multifunction device B that has the same function as an unusable optional function but use of the function is restricted, on a condition that the optional function whose use restriction is released by using the release information becomes unusable due to occurrence of an error (see, for example, JP-A-2010-109721).

SUMMARY

An additional processing apparatus that performs additional processing for functions of an information processing apparatus may be connected to the information processing apparatus, so that the additional processing apparatus performs the additional processing for the functions of the information processing apparatus. However, in such a case, if the additional processing apparatus enters an unusable state due to, for example, detachment of the additional processing apparatus, occurrence of a connection failure, or failure, the additional processing cannot be performed.

Aspects of non-limiting embodiments of the present disclosure relate to making it possible to perform additional processing even when an additional processing apparatus that performs additional processing for a function of an information processing apparatus is in an unusable state.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire an additional processing program for performing additional processing in response to a connection of an additional processing apparatus configured to perform the additional processing for a function of the information processing apparatus; and store the acquired additional processing program in the information processing apparatus.

BRIEF DESCRIPTION OF THE DRAWINGS

Exemplary embodiment(s) of the present disclosure will be described in detail based on the following figures, wherein:

FIG. 3 is a diagram illustrating an example of a processing order determination table referred to in the first operation example of the image processing apparatus according to the first exemplary embodiment of the present disclosure;

FIG. 5 is a diagram illustrating an example of a processing order determination table referred to in the second operation example of the image processing apparatus according to the first exemplary embodiment of the present disclosure;

FIG. 7 is a diagram illustrating an example of a processing order determination table referred to in the third operation example of the image processing apparatus according to the first exemplary embodiment of the present disclosure;

FIG. 8 is a flowchart illustrating an operation example of the image processing apparatus according to the first exemplary embodiment of the present disclosure;

FIG. 9 is a diagram illustrating a configuration example of an image processing apparatus according to a second exemplary embodiment of the present disclosure.

DETAILED DESCRIPTION

Hereinafter, exemplary embodiments of the present disclosure will be described in detail with reference to the accompanying drawings.

Outline of the Present Exemplary Embodiment

In the present exemplary embodiment, an information processing apparatus acquires an additional processing program for performing additional processing in response to a connection of an additional processing apparatus that performs the additional processing for a function of the information processing apparatus, and stores the acquired additional processing program in the information processing apparatus.

The information processing apparatus may acquire the additional processing program at a predetermined time point after the additional processing apparatus is connected. The predetermined time point may be a time point at which an instruction to perform the additional processing or a function that uses the additional processing is received. In the following description, it is assumed that the additional processing program is acquired when the additional processing apparatus is connected.

Furthermore, the information processing apparatus may use the additional processing program stored in the information processing apparatus for any purpose. In the following description, it is assumed that when the additional processing apparatus is unusable, the information processing apparatus is used to perform the additional processing.

Here, the information processing apparatus may be a general information processing apparatus that performs information processing other than image reading and image formation, but in the following description, an image processing apparatus that performs the image reading and the image formation, particularly, a main body processor device of the image processing apparatus will be taken as an example. The additional processing may be a new function to be added to a basic function originally provided in the image processing apparatus or may be new processing to be added to processing originally performed by the basic function of the image processing apparatus, but in the following description, the latter will be taken as an example. As an additional processing apparatus that performs the additional processing, an external processor device will be taken as an example.

The main body processor device may acquire an additional processing program for performing the additional processing from, for example, a server on the Internet, but in the following description, it is assumed that the additional processing program is acquired from the external processor device.

First Exemplary Embodiment

Configuration of Image Processing Apparatus

Figure 1:
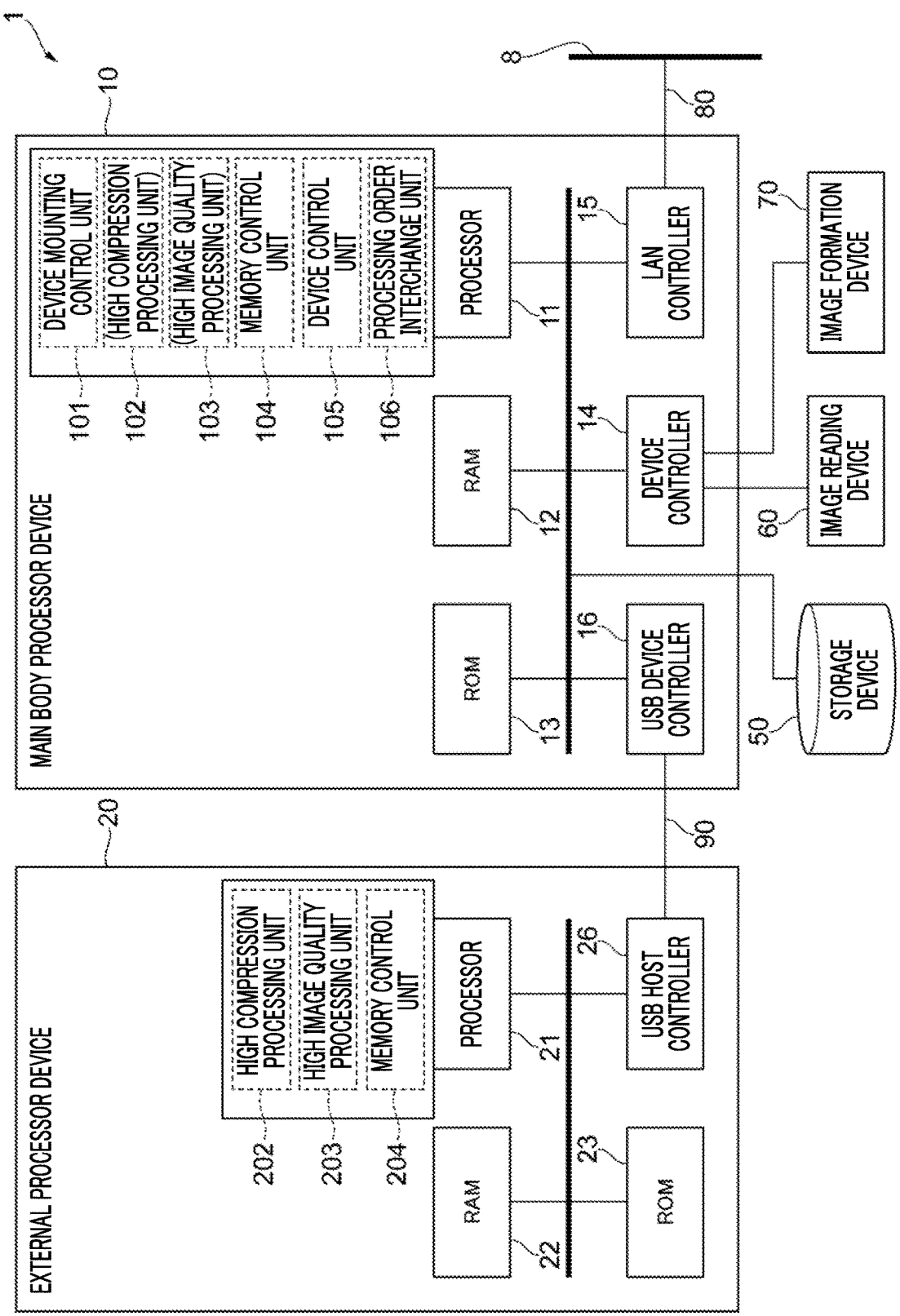
FIG. 1 is a diagram illustrating a configuration example of an image processing apparatus according to a first exemplary embodiment of the present disclosure.

FIG. 1 is a diagram illustrating a configuration example of an image processing apparatus 1 according to a first exemplary embodiment. As illustrated in FIG. 1, the image processing apparatus 1 includes a main body processor device 10, an external processor device 20, a storage device 50, an image reading device 60, and an image formation device 70. The main body processor device 10 is connected to a wired local area network (LAN) 8 through a wired LAN cable 80, and the external processor device 20 is connected to the main body processor device 10 through a Universal Serial Bus (USB) cable 90.

The main body processor device 10 provides a basic function of the image processing apparatus 1. Here, as the basic function, a scan function, a copy function, and a print function are taken as examples. The main body processor device 10 is implemented by hardware mounted on a main board.

The external processor device 20 provides an optional function for the basic function of the image processing apparatus 1. The optional function may be a function independent of the basic function and may be optional processing used in basic processing performed by the main body processor device 10 to implement the basic function, and this is an example of the additional processing anyway. Here, for example, scan processing performed by the main body processor device 10 to implement the scan function and the copy function, high compression processing and high image quality processing used in copy processing will be exemplified as the optional functions. The external processor device 20 is implemented by hardware mounted on an option board.

The storage device 50 compresses image data read by the image reading device 60 and stores the compressed data. When a processing program as an example of an additional processing program for performing optional processing is acquired from the external processor device 20 as will be described below, the processing program may be stored. The storage device 50 is implemented by, for example, a hard disk drive (HDD).

The image reading device 60 reads an image recorded on a recording medium such as paper. Here, the image reading device 60 is, for example, a scanner, and may use a charge coupled device (CCD) method that a lens compresses reflected light with respect to light emitted from a light source onto an original document and a CCD receives the light, or a contact image sensor (CIS) method that a CIS receives reflected light with respect to light emitted from an LED light source onto the original document sequentially.

The image formation device 70 forms an image on a recording medium such as paper. Here, the image formation device 70 is, for example, a printer and may use an electrophotographic process for forming an image by transferring toner adhered to a photoconductor onto a recording medium, or an inkjet process for forming an image by ejecting ink onto the recording medium.

Next, a configuration of the main body processor device 10 will be described in detail. As illustrated in FIG. 1, the main body processor device 10 includes a processor 11, a random access memory (RAM) 12, a read only memory (ROM) 13, a device controller 14, a LAN controller 15, and a USB device controller 16.

The processor 11 implements respective functions which will be described below by loading various programs stored in the ROM 13 or the like into the RAM 12 and executing the programs.

The RAM 12 is a memory used as a working memory or the like of the processor 11. The RAM 12 temporarily stores image data read by the image reading device 60. Furthermore, when a processing program for performing optional processing is acquired from the external processor device 20 as will be described below, the processing program may be stored.

The ROM 13 is a memory that stores various programs and the like to be executed by the processor 11.

The device controller 14 controls image reading by the image reading device 60 and image formation by the image formation device 70.

The LAN controller 15 is a network interface controller for transmitting and receiving various information via the wired LAN cable 80.

The USB device controller 16 is a network interface controller for transmitting and receiving various information to and from the external processor device 20 via a USB cable 90 conforming to the USB, which is an interface capable of inserting and removing a live line. Here, the various information include information on a function of the external processor device 20 that uses optional processing, and scan data, copy data, and print data which are acquired by the main body processor device 10, and the like. Here, the USB is taken as an example, but a standard of the network interface may not be the USB.

In the main body processor device 10, the processor 11 loads various programs stored in the ROM 13 and the like into the RAM 12 and executes the programs, and thereby, a device mounting control unit 101, a memory control unit 104, a device control unit 105, and a processing order interchange unit 106 operate.

The device mounting control unit 101 monitors occurrence of a connection detection event of the external processor device 20 in the USB device controller 16. If the connection detection event occurs, after initial setting of a network is performed, information on the function of the external processor device 20 which uses the optional processing included in the connection detection event is acquired. If there is a scan function or a copy function among the functions, a processing program for executing the optional processing is acquired and stored in the main body processor device 10. Setting of a network table of the main body processor device 10 is changed, and the external processor device 20 can access the scan data and the copy data held by the main body processor device 10 via the USB device controller 16. In the present exemplary embodiment, the device mounting control unit 101 is provided as an example of a unit that acquires an additional processing program and as an example of a unit that stores the acquired additional processing program in the information processing apparatus.

The memory control unit 104 controls a memory device such as the RAM 12 or the ROM 13. The memory control unit 104 redistributes a memory resource such as the RAM 12 from processing having a low priority to processing having a high priority.

The device control unit 105 instructs the device controller 14 to read an image in the image reading device 60 or to form an image in the image formation device 70. The device control unit 105 checks processing states of the image reading device 60 and the image formation device 70.

The processing order interchange unit 106 determines priority of plural processing to be performed in parallel, and interchanges a processing order of the plural processing according to a determination result.

For example, when the scan processing and the print processing are performed in parallel, the processing order interchange unit 106 interchanges an order of the scan processing and the print processing such that at least a part of the scan processing is completed prior to the print processing. In this case, at least a part of the processing is, for example, processing of reading an original document. This is an example of processing that uses an object collected from an information processing apparatus by an operator.

When the copy processing and the print processing are performed in parallel, the processing order interchange unit 106 interchanges an order of the copy processing and the print processing such that at least a part of the processing of the copy processing is completed prior to the print processing. In this case, at least a part of the processing is, for example, processing of reading an original document and processing of outputting a printed matter. This is an example of processing that uses an object collected from an information processing apparatus by an operator.

In the present exemplary embodiment, the scan processing or the copy processing is employed as an example of a first function that uses the additional processing. The print processing is employed as an example of a second function that does not use the additional processing. When the first function and the second function are performed in parallel, the processing order interchange unit 106 is provided as an example of a unit that changes an order of processing such that at least a part of the processing constituting the first function is completed prior to the second function.

Alternatively, the processing order interchange unit 106 may interchange the order of the print processing and other processing such that at least a part of the print processing is completed prior to the other processing. In this case, at least a part of the processing is, for example, processing of reading data from a recording medium. This is also an example of processing that uses an object collected from the information processing apparatus by an operator.

The processing order interchange unit 106 determines priority of the plural processing to be performed in one processing, and also interchanges a processing order of the plural processing according to a determination result.

For example, when the plural processing is performed during the scan processing, the processing order interchange unit 106 interchanges an order of at least a part of the processing of the scan processing and other processing. In this case, at least a part of the processing is, for example, processing of reading an original document, and the other processing is processing of compressing a read image and processing of storing the compressed image.

In the present exemplary embodiment, processing of reading an original document is used as an example of at least a part of the processing constituting the first function, and processing of compressing a read image and processing of storing a compressed image are used as an example of processing other than at least a part of the processing. The processing order interchange unit 106 is provided as an example of a unit that interchanges the order of at least a part of the processing and other processing.

A high compression processing unit 102 and a high image quality processing unit 103 are acquired from the external processor device 20 when the external processor device 20 is connected, and the processing units are also indicated by parentheses in the figure.

Next, a configuration of the external processor device 20 will be described in detail. As illustrated, the external processor device 20 includes a processor 21, a RAM 22, a ROM 23, and a USB host controller 26.

The processor 21 loads various programs stored in the ROM 23 and the like into the RAM 22 and executes the programs, thereby, implementing respective functions to be described below.

The RAM 22 is a memory used as a working memory and the like of the processor 21.

The ROM 23 is a memory that stores various programs and the like to be executed by the processor 21.

The USB host controller 26 is a network interface controller for transmitting and receiving various information to and from the main body processor device 10 via the USB cable 90 conforming to the USB, which is an interface capable of inserting and removing a live line. Here, the various information include information on a function of the external processor device 20 that uses optional processing, and scan data, copy data, and print data which are acquired by the main body processor device 10, and the like. Here, the USB is taken as an example, but a standard of the network interface may not be the USB.

In the external processor device 20, the processor 21 loads various programs stored in the ROM 23 and the like into the RAM 22 and executes the programs, and thereby, a high compression processing unit 202, a high image quality processing unit 203, and a memory control unit 204 operate.

The high compression processing unit 202 performs processing of compressing target data at a high compression rate. For example, the processing of compressing is performed to reduce capacity of scan data, which is used for a scan function. That is, the high compression processing unit 202 adds an additional value for reducing capacity of the scan data to the scan function which is a basic function.

The high image quality processing unit 203 performs processing of increasing an image quality of target data. For example, processing of improving an image quality of copy data is performed, which is used for a copy function. Alternatively, processing of improving an image quality of scanned data is performed, which is used for a scan function. That is, the high image quality processing unit 203 adds an additional value for improving an image quality of the copy data or the scan data to a copy or scan function which is the basic function.

The memory control unit 204 controls memory devices such as the RAM 22 and the ROM 23.

In the example illustrated in FIG. 1, the storage device 50 is provided outside the main body processor device 10. This is because it is assumed that the main body processor device 10 is implemented by hardware mounted in a main board and that the storage device 50 is implemented by an HDD. However, when it is assumed that the storage device 50 is implemented by a medium other than the HDD, the storage device 50 may be provided in the main body processor device 10 depending on a type of the medium.

In the above description, a processing program acquired from the external processor device 20 is stored in either one of the storage device 50 and the RAM 12. If it is not clarified where the program is stored, it is assumed that the processing program is stored on a main body side.

Operation of Image Processing Apparatus

First, a first operation example of the image processing apparatus 1 according to the first exemplary embodiment will be described. In the first operation example, the main body processor device 10 installs a processing program for performing high compression processing from the external processor device 20 when the external processor device 20 is connected. Thereafter, the main body processor device 10 performs the scan processing and the print processing in parallel.

Figure 2:
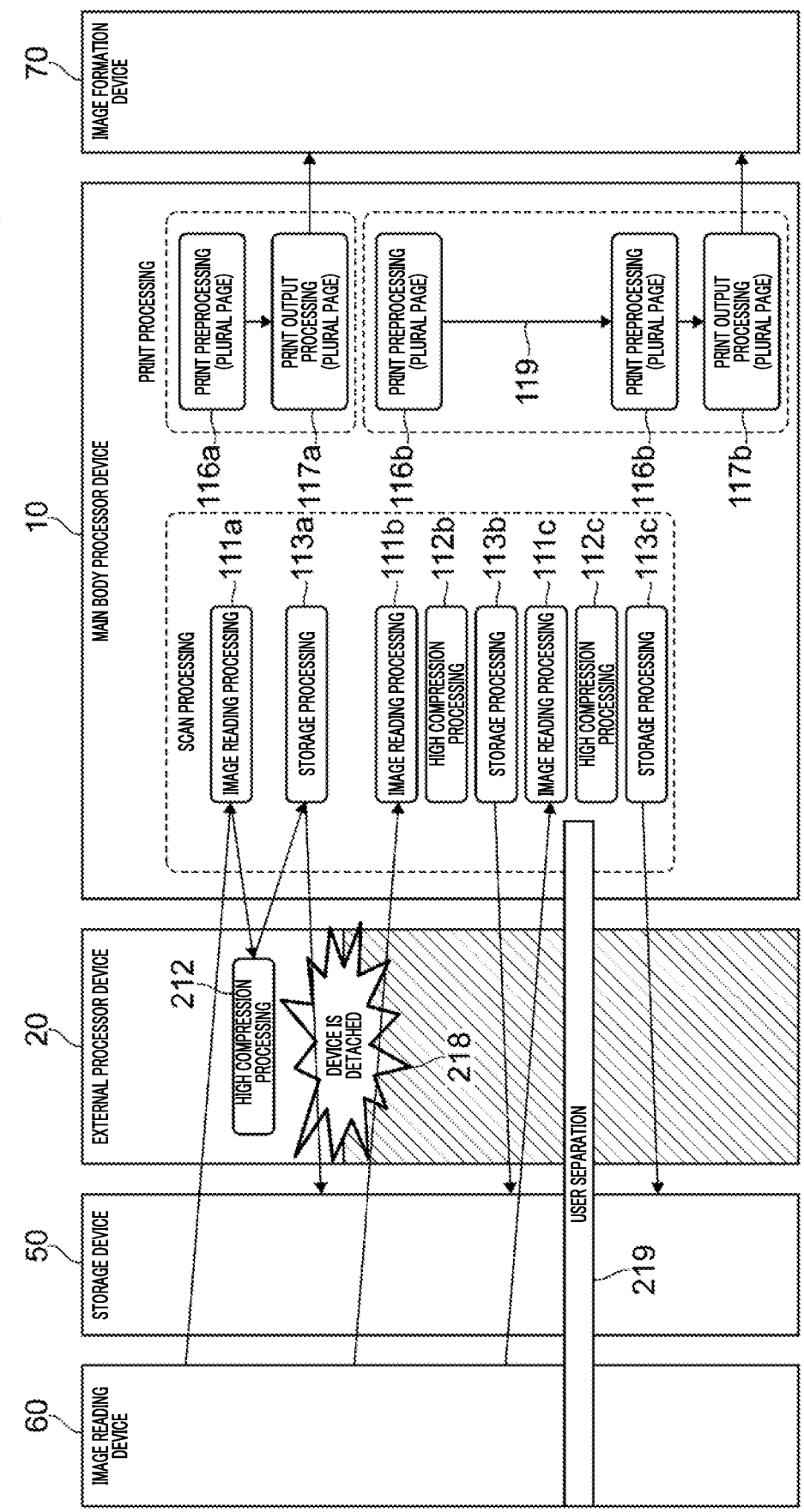
FIG. 2 is a schematic diagram illustrating a first operation example of the image processing apparatus according to the first exemplary embodiment of the present disclosure.

FIG. 2 is a schematic diagram illustrating the first operation example of the image processing apparatus 1 according to the first exemplary embodiment. However, this schematic diagram illustrates a state in which the scan processing and the print processing are performed in parallel after the main body processor device 10 installs a processing program for performing high compression processing from the external processor device 20 previously.

In this example, it is assumed that the image processing apparatus 1 performs the scan processing of scanning an original document of three pages. In this case, after the main body processor device 10 performs image reading processing 111a for an original document of a first page by the image reading device 60, the external processor device 20 performs high compression processing 212, and the main body processor device 10 performs storage processing 113a in the storage device 50.

It is assumed that the image processing apparatus 1 is also performing print processing of outputting printed matters of a plural pages. In this case, in parallel with the scan processing, the main body processor device 10 performs print preprocessing 116a for the plural pages as the print processing, and performs print output processing 117a for the plural pages by the image formation device 70.

Here, it is assumed that the external processor device 20 is detached as indicated by an explosion mark 218.

In this case, the main body processor device 10 temporarily stops the processing not relating to the scan processing such as the print preprocessing. At this time, a used resource such as a work memory is also redistributed to the scan processing. Specifically, as indicated by a start of an arrow 119, the main body processor device 10 temporarily stops print preprocessing 116b for the plural pages.

For an original document of a second page, after the main body processor device 10 performs image reading processing 111b by the image reading device 60, the main body processor device 10 performs high compression processing 112b instead of the external processor device 20, and the main body processor device 10 performs storage processing 113b in the storage device 50.

The main body processor device 10 performs image reading processing 111c by the image reading device 60 for the original document of a third page. At this point, since the original document of the third page is read, a user reads all the original documents, and as indicated by a band mark 219, a hand of the user is separated from the image processing apparatus 1. Thereafter, the main body processor device 10 instead of the external processor device 20 performs high compression processing 112c, and the main body processor device 10 performs storage processing 113c in the storage device 50. Thereby, the scan processing ends.

Then, as indicated by an end of the arrow 119, the main body processor device 10 restarts print preprocessing 116b for the plural pages, and performs print output processing 117b for the plural pages by the image formation device 70.

However, in the first operation example, the main body processor device 10 determines a processing order of each processing of the scan processing and each processing of the print processing with reference to a processing order determination table stored in the RAM 12, the storage device 50, or the like.

FIG. 3 is a diagram illustrating an example of the processing order determination table referred to in the first operation example of the image processing apparatus 1 according to the first exemplary embodiment. In the figure, priority indicates that the smaller the value, the higher the priority. That is, FIG. 3 illustrates that the image reading processing, the high compression processing, the high image quality processing, and the storage processing of the scan processing have the highest priority, and the print preprocessing and the print output processing of the print processing have the lowest priority. Therefore, the main body processor device 10 performs the scan processing prior to the print processing with reference to the processing order determination table. Thereby, a user can bring back the original document used in the scan processing quickly.

Next, a second operation example of the image processing apparatus 1 according to the first exemplary embodiment will be described. Also in the second operation example, when the external processor device 20 is connected, the main body processor device 10 acquires and stores a processing program for performing high compression processing from the external processor device 20. Thereafter, the main body processor device 10 performs the scan processing and the print processing in parallel.

Figure 4:
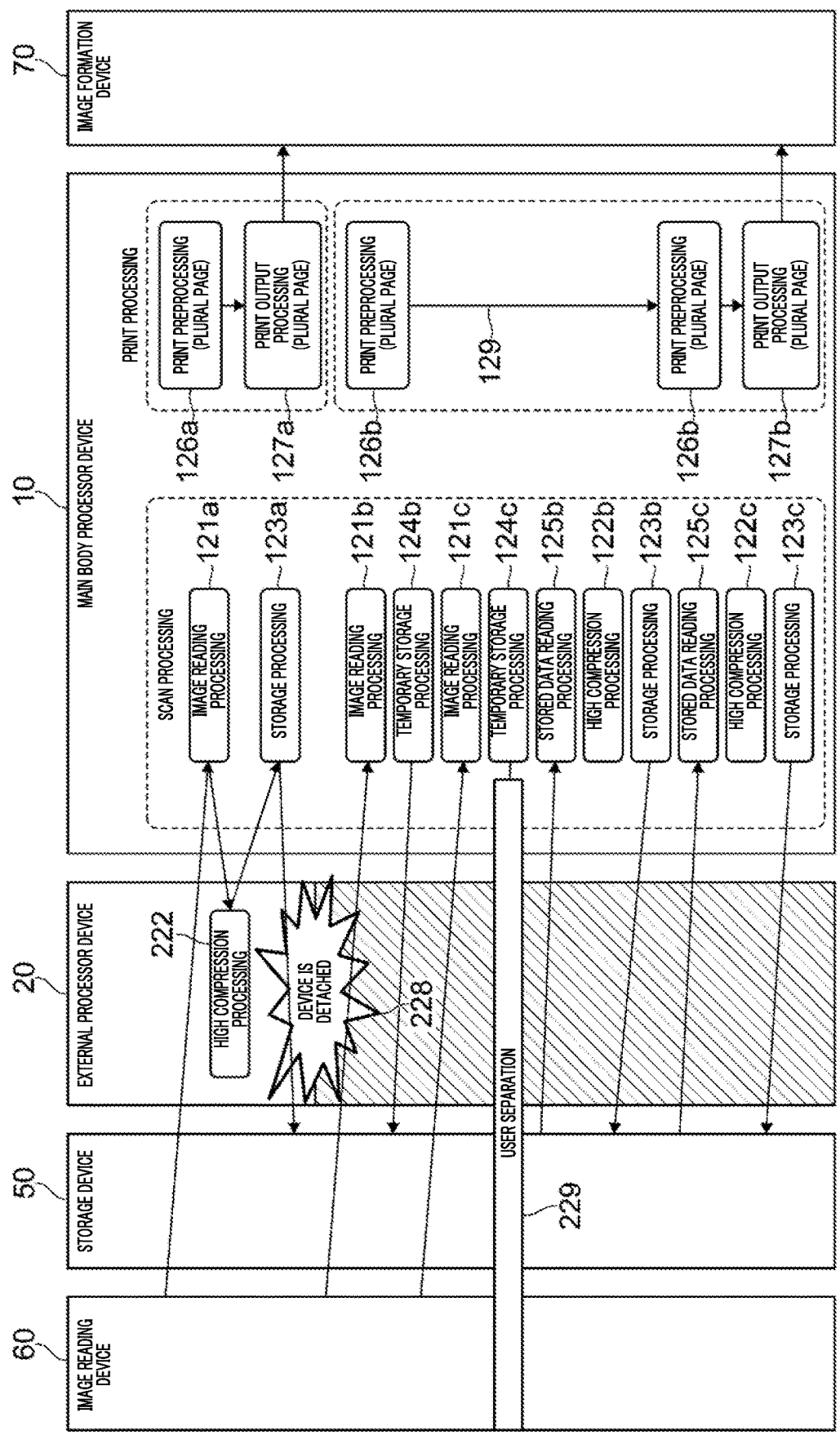
FIG. 4 is a schematic diagram illustrating a second operation example of the image processing apparatus according to the first exemplary embodiment of the present disclosure.

FIG. 4 is a schematic diagram illustrating the second operation example of the image processing apparatus 1 according to the first exemplary embodiment. However, this schematic diagram illustrates a state in which the scan processing and the print processing are performed in parallel after the main body processor device 10 installs a processing program for performing high compression processing from the external processor device 20 previously.

Also in this example, it is assumed that the image processing apparatus 1 performs the scan processing of scanning an original document of three pages. In this case, after the main body processor device 10 performs image reading processing 121*a* by the image reading device 60 with respect to the original document of a first page, the external processor device 20 performs high compression processing 222, and the main body processor device 10 performs storage processing 123*a* in the storage device 50.

It is assumed that the image processing apparatus 1 is also performing print processing of outputting printed matters of a plural pages. In this case, in parallel with the scan processing, the main body processor device 10 performs print preprocessing 126*a* for a plural pages as the print processing, and performs print output processing 127*a* for the plural pages by the image formation device 70.

Here, it is assumed that the external processor device 20 is detached as indicated by an explosion mark 228.

In this case, the main body processor device 10 temporarily stops the processing not relating to the scan processing such as the print preprocessing. At this time, a used resource such as a work memory is also redistributed to the scan processing. Specifically, as indicated by a start of the arrow 129, the main body processor device 10 temporarily stops print preprocessing 126*b* for the plural pages.

In addition, in the second operation example, after the image reading processing is performed on all the remaining original documents, an order of the processing is changed among the scan processing such that the high compression processing and the storage processing are performed on these original documents.

Accordingly, the main body processor device 10 performs image reading processing 121*b* by the image reading device 60 for the original document of a second page, and then performs temporary storage processing 124*b* for the storage device 50. After image reading processing 121*c* by the image reading device 60 is performed for the original document of a third page, temporary storage processing 124*c* for the storage device 50 is performed. At this point, since the original document of the third page is read, a user reads all the original documents, and as indicated by a band mark 229, a hand of the user is separated from the image processing apparatus 1.

Thereafter, the main body processor device 10 performs stored data reading processing 125*b* from the storage device 50 for the original document of the second page, the main body processor device 10 performs high compression processing 122*b* instead of the external processor device 20, and the main body processor device 10 performs storage processing 123*b* in the storage device 50.

The main body processor device 10 performs stored data reading processing 125*c* from the storage device 50 for the original document of the third page, the main body processor device 10 performs high compression processing 122*c* instead of the external processor device 20, and the main body processor device 10 performs storage processing 123*c* in the storage device 50. Thereby, the scan processing ends.

Then, as indicated by an end of the arrow 129, the main body processor device 10 restarts the print preprocessing 126*b* for the plural pages, and performs print output processing 127*b* for the plural pages by the image formation device 70.

However, also in the second operation example, the main body processor device 10 determines the processing order of each processing of the scan processing and each processing of the print processing with reference to the processing order determination table stored in the RAM 12, the storage device 50, or the like.

FIG. 5 is a diagram illustrating an example of a processing order determination table referred to in the second operation example of the image processing apparatus 1 according to the first exemplary embodiment. In the figure, priority indicates that the smaller the value, the higher the priority. That is, FIG. 5 illustrates that the image reading processing of the scan processing has the highest priority, the high compression processing, the high image quality processing, and the storage processing of the scan processing have the second highest priority, and the print preprocessing and the print output processing of the print processing have the lowest priority. Accordingly, the main body processor device 10 performs the scan processing prior to the print processing with reference to the processing order determination table, and performs the image reading processing prior to the high compression processing, the high image quality processing, and the storage processing during the scan processing. Thereby, a user can bring back the original document used in the scan processing more quickly.

Next, a third operation example of the image processing apparatus 1 according to the first exemplary embodiment will be described. In the third operation example, when the external processor device 20 is connected, the main body processor device 10 installs a processing program for performing high image quality processing from the external processor device 20. Thereafter, the main body processor device 10 performs the copy processing and the print processing in parallel.

Figure 6:
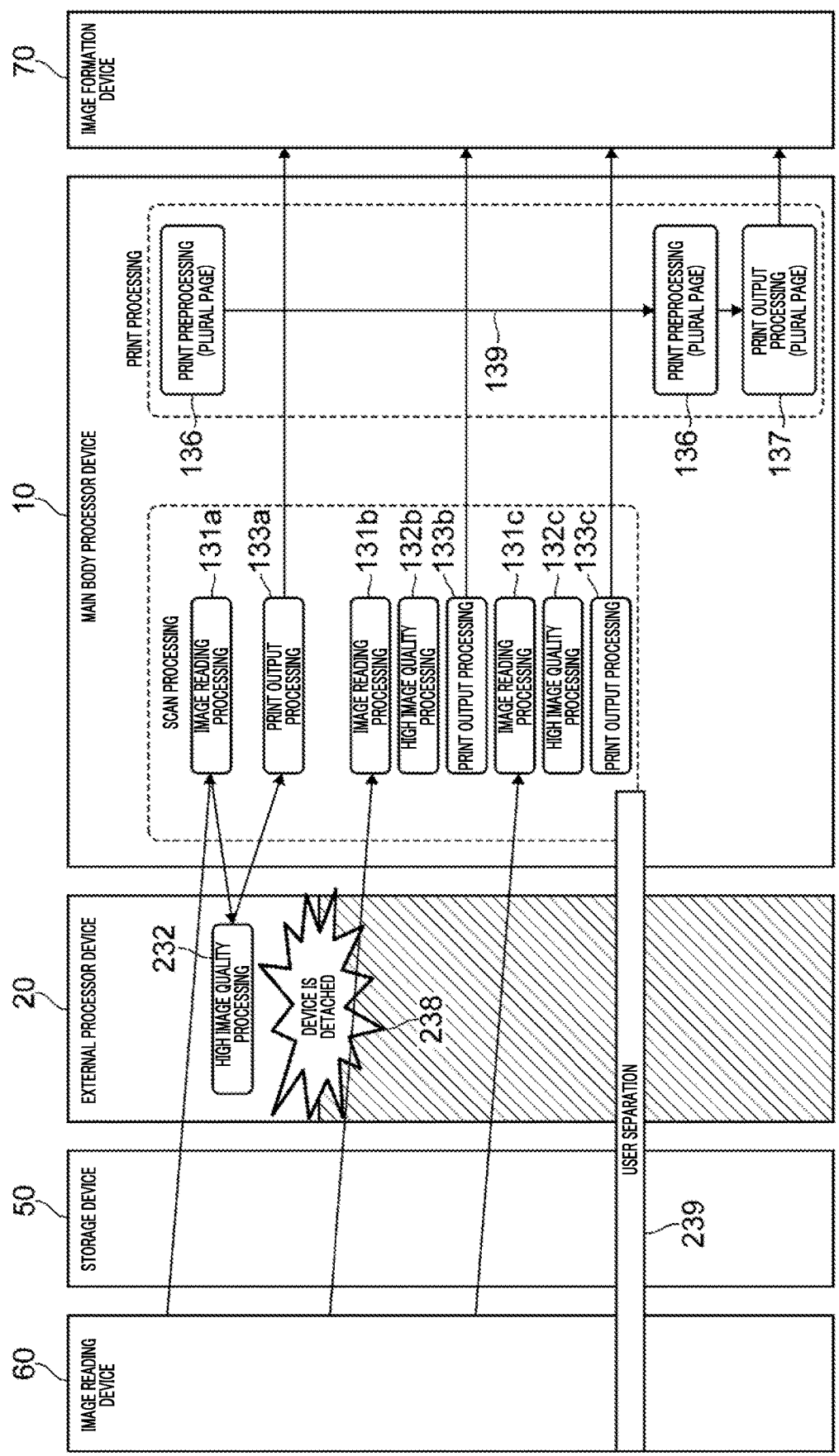
FIG. 6 is a schematic diagram illustrating a third operation example of the image processing apparatus according to the first exemplary embodiment of the present disclosure.

FIG. 6 is a schematic diagram illustrating the third operation example of the image processing apparatus 1 according to the first exemplary embodiment. However, this schematic diagram illustrates a state in which the copy processing and the print processing are performed in parallel after the main body processor device 10 installs a processing program for performing the high image quality processing from the external processor device 20 previously.

In this example, it is assumed that the image processing apparatus 1 performs copy processing of copying an original document of three pages. In this case, after the main body processor device 10 performs image reading processing 131*a* by the image reading device 60 for an original document of a first page, the external processor device 20 performs high image quality processing 232, and the main body processor device 10 performs print output processing 133*a* by the image formation device 70.

It is assumed that the image processing apparatus 1 is also to perform print processing of outputting printed matters of a plural pages. However, since the main body processor device 10 performs the copy processing, print preprocessing 136 for a plural pages is temporarily stopped as indicated by a start of an arrow 139.

Here, it is assumed that the external processor device 20 is detached as indicated by an explosion mark 238.

In this case, the main body processor device 10 temporarily stops the processing not relating to the copy processing such as the print preprocessing. At this time, a used resource such as a work memory is also redistributed to the scan processing. Specifically, the main body processor device 10 keeps the print preprocessing 136 for the plural pages stopped.

After the main body processor device 10 performs image reading processing 131*b* by the image reading device 60 for the original document of the second page, the main body processor device 10 performs high image quality processing 132b instead of the external processor device 20, and the main body processor device 10 performs print output processing 133b by the image formation device 70.

After the main body processor device 10 performs image reading processing 131c by the image reading device 60 for the original document of the third page, the main body processor device 10 performs high image quality processing 132c instead of the external processor device 20, and the main body processor device 10 performs print output processing 133c by the image formation device 70. At this time, since the third printed matter is output, the user holds all the printed matters, and the user's hand is separated from the image processing apparatus 1 as indicated by the band mark 239. Thereby, the copy processing is completed.

Then, as indicated by an end of the arrow 139, the main body processor device 10 resumes print preprocessing 136 for a plural pages and performs print output processing 137 for the plural pages by the image formation device 70.

However, in the third operation example, the main body processor device 10 determines a processing order of each processing of the copy processing and each processing of the print processing with reference to the processing order determination table stored in the RAM 12, the storage device 50, or the like.

FIG. 7 is a diagram illustrating an example of the processing order determination table referred to in the third operation example of the image processing apparatus 1 according to the first exemplary embodiment. In the figure, priority indicates that the smaller the value, the higher the priority. That is, FIG. 7 illustrates that the image reading processing, the high image quality processing, and the print output processing of the copy processing have the highest priority, and the print preprocessing and the print output processing of the print processing have the lowest priority. Accordingly, the main body processor device 10 performs the copy processing prior to the print processing with reference to the processing order determination table. Thereby, a user can bring back the original document used in the copy processing and the printed matters output during the copy processing quickly.

FIG. 8 is a flowchart illustrating an operation example of the main body processor device 10 of the image processing apparatus 1 according to the first exemplary embodiment. In the present exemplary embodiment, although it is described that the main body processor device 10 installs a processing program for performing optional processing from the external processor device 20 when the external processor device 20 is connected, the processing program will be described as being installed at the start of the scan processing only in this operation example. In this operation example, as illustrated in FIGS. 2 to 7, a case is assumed in which the main body processor device 10 performs the scan processing or the copy processing and the print processing simultaneously.

If a start of the scan processing is instructed, the device mounting control unit 101 in the main body processor device 10 first determines whether or not the external processor device 20 is mounted (step S151).

If it is determined in step S151 that the external processor device 20 is mounted, the device mounting control unit 101 inquires of the external processor device 20 to specify optional processing of the external processor device 20 (step S152). In the examples illustrated in FIGS. 2 to 5, at least the high compression processing is specified, and in the examples illustrated in FIGS. 6 and 7, at least the high image quality processing is specified.

The device mounting control unit 101 determines whether or not a processing program for performing the optional processing specified in step S152, is installed on a main body side (step S153).

If it is not determined in step S153 that the processing program for performing the optional processing is installed on the main body side, the device mounting control unit 101 acquires the processing program from the external processor device 20 (step S154) and installs the processing program on the main body side (step S155). Then, the processing proceeds to step S156.

If it is determined in step S153 that the processing program for performing the optional processing is installed on the main body side, the device mounting control unit 101 makes the processing proceed to step S156 without installing the processing program on the main body side.

In this state, the main body processor device 10 performs basic processing (step S156). On the other hand, the external processor device 20 performs the optional processing. In the examples illustrated in FIGS. 2 to 5, the main body processor device 10 performs the image reading processing and the storage processing, and the high compression processing unit 202 performs the high compression processing in the external processor device 20. In the examples illustrated in FIGS. 6 and 7, the main body processor device 10 performs the image reading processing and the print output processing, and the high image quality processing unit 203 performs the high image quality processing in the external processor device 20. When performing the print processing is instructed, the main body processor device 10 also performs the print processing simultaneously.

Thereafter the device mounting control unit 101 in the main body processor device 10 determines whether or not the external processor device 20 is in an unusable state (step S157). Here, for example, the unusable state indicates that the external processor device 20 is detached or that the external processor device 20 fails.

If it is not determined in step S157 that the external processor device 20 is unusable, the main body processor device 10 determines whether or not there is processing to be continued (step S158).

If it is determined in step S158 that there is the processing to be continued, the main body processor device 10 returns to step S156 to continue the processing. In the examples illustrated in FIG. 2 to FIG. 7, if processing for each original document is performed in step S156, and if it is determined that there is a next original document in step S158, the processing is continued.

If it is not determined in step S158 that there is the processing to be continued, the main body processor device 10 ends the processing. In the examples illustrated in FIG. 2 to FIG. 7, if the processing for each original document is performed in step S156, and if it is not determined that there is a next original document in step S158, the scan processing or the copy processing ends.

If it is determined in step S157 that the external processor device 20 is an unusable state, the device control unit 105 checks a processing state of a main body (step S159). Then, if there is the print processing being performed, the processing order interchange unit 106 temporarily stops the processing with a lower priority such as the print processing according to the priority order of the processing order determination table, and interchanges the processing order to the scan processing or the copy processing with the higher priority order (step S160). The memory control unit 104 redistributes a memory resource such as the RAM 12 to the scan processing or the copy processing with a higher priority (step S161).

In this state, the main body processor device 10 performs basic processing and performs optional processing performed by the external processor device 20 instead of the external processor device 20, (step S162). In the examples illustrated in FIGS. 2 to 5, the main body processor device 10 performs the high compression processing instead of the external processor device 20 in addition to the image reading processing and the storage processing. Specifically, in the examples illustrated in FIGS. 2 and 3, the main body processor device 10 performs the image reading processing, the high compression processing, and the storage processing. In the examples illustrated in FIG. 4 and FIG. 5, the main body processor device 10 performs the image reading processing and the temporary storage processing until there is no original document, and then performs the stored data reading processing, the high compression processing, and the storage processing. In the examples illustrated in FIGS. 6 and 7, in addition to the image reading processing and the print output processing, the main body processor device 10 performs the high image quality processing instead of the external processor device 20. Specifically, the main body processor device 10 performs the image reading processing, the high image quality processing, and the print output processing.

If it is not determined in step S151 that the external processor device 20 is mounted, the main body processor device 10 also makes the processing proceed to step S162. However, in step S163, the basic processing and the optional processing are performed only when the processing program for performing the optional processing is installed on the main body side, and only the basic processing is performed when the processing program for performing the optional processing is not installed on the main body side.

Thereafter, the main body processor device 10 determines whether or not there is processing to be continued (step S163).

If it is determined in step S163 that there is the processing to be continued, the main body processor device 10 returns to step S162 and continues the processing. In the examples illustrated in FIG. 2 to FIG. 7, if it is assumed that processing for each original document is performed in step S162, and if it is determined that there is a next original document in step S163, the processing is continued.

If it is not determined in step S163 that there is the processing to be continued, the main body processor device 10 ends the processing. In the examples illustrated in FIG. 2 to FIG. 7, if it is assumed that the processing for each original document is performed in step S162, and if it is not determined that there is a next original document in step S163, the scan processing or the copy processing end.

Although subsequent processing is not illustrated in FIG. 8, the memory control unit 104 returns the redistributed memory resource such as the RAM 12 to the original distribution, and the main body processor device 10 resumes the print processing that temporarily stops.

In the above description, although whether or not there is processing to be continued in step S158 and step 163 is determined each time an original document of one page is scanned, the present disclosure is not limited to this. For example, when plural pieces of instruction information for instructing scan or copy are waiting for processing, it may be determined each time the instruction information is switched. When band processing is performed, it may be determined each time a band is switched. Furthermore, when different processing is performed for each color, it may be determined each time a color is switched.

Second Exemplary Embodiment

Configuration of Image Processing Apparatus

FIG. 9 is a diagram illustrating a configuration example of an image processing apparatus 2 according to a second exemplary embodiment. As illustrated, the image processing apparatus 2 includes a main body processor device 30, an external processor device 40, a storage device 50, an image reading device 60, and an image formation device 70. The main body processor device 30 is connected to a wired LAN 8 through a wired LAN cable 80, and the external processor device 40 is connected to the main body processor device 30 through a USB cable 90.

The main body processor device 30 provides a basic function of the image processing apparatus 2. Here, as the basic function, a scan function, a copy function, and a print function are taken as examples. The main body processor device 30 is implemented by hardware mounted on a main board.

The external processor device 40 provides an optional function for the basic function of the image processing apparatus 2. The optional function may be a function independent of the basic function or may be optional processing used in the basic processing performed by the main body processor device 30 to implement the basic function. Here, the scan processing performed by the main body processor device 30 to implement the scan function and the copy function, and the high compression processing and the high image quality processing used in the copy processing will be exemplified as the optional function. The external processor device 40 is implemented by hardware mounted on an option board.

Since the storage device 50, the image reading device 60, and the image formation device 70 are the same as the devices described in the first exemplary embodiment, descriptions thereof are omitted.

Next, a configuration of the main body processor device 30 will be described in detail. As illustrated, the main body processor device 30 includes a processor 31, a RAM 32, a ROM 33, a device controller 34, a LAN controller 35, and a USB device controller 36.

Since the processor 31, the RAM 32, the ROM 33, the device controller 34, the LAN controller 35, and the USB device controller 36 are the same as the processor 11, the RAM 12, the ROM 13, the device controller 14, the LAN controller 15, and the USB device controller 16 illustrated in FIG. 1, descriptions thereof are omitted.

In the main body processor device 30, the processor 31 loads various programs stored in the ROM 33 or the like into the RAM 32 and performs the programs, and thereby, a device mounting control unit 301, a memory control unit 304, and a device control unit 305 operate.

The device mounting control unit 301 monitors occurrence of a connection detection event of the external processor device 40 in the USB device controller 36. When the connection detection event occurs, initial setting of a network is performed, and thereafter, information on a function of the external processor device 40 that uses the optional processing is acquired from the external processor device 40. If there is a scan function or a copy function among the functions, a processing program for performing the optional processing is acquired and stored in the main body processor device 30. Setting of a network table of the main body processor device 30 is changed, and the external processor device 40 can access scan data and copy data held by the main body processor device 30 via the USB device controller 36. In the present exemplary embodiment, the device mounting control unit 301 is provided as an example of a unit that acquires the additional processing program and as an example of a unit that stores the acquired additional processing program in the information processing apparatus.

The memory control unit 304 controls memory devices such as the RAM 32 and the ROM 33. The memory control unit 304 redistributes a memory resource such as the RAM 32 from processing with a lower priority to processing with a higher priority.

The device control unit 305 instructs the device controller 34 to read an image in the image reading device 60 or to form an image in the image formation device 70. The device control unit 305 checks processing states of the image reading device 60 and the image formation device 70.

A compression processing unit 302 is acquired from the external processor device 40 when the external processor device 40 is connected, which is also illustrated in a parenthesis in the figure.

Next, a configuration of the external processor device 40 will be described in detail. As illustrated, the external processor device 40 includes a processor 41, a RAM 42, a ROM 43, and a USB host controller 46.

Since the processor 41, the RAM 42, the ROM 43, and the USB host controller 46 are the same as the processor 21, the RAM 22, the ROM 23, and the USB host controller 26 illustrated in FIG. 1, descriptions thereof are omitted.

In the external processor device 40, the processor 41 loads various programs stored in the ROM 43 or the like into the RAM 42 and performs the programs, and thereby, a compression processing unit 402 and a memory control unit 404 operate.

The compression processing unit 402 performs processing of compressing target data. For example, the processing of compressing is performed to reduce capacity of scan data, which is used for a scan function. That is, the compression processing unit 402 adds an additional value for reducing capacity of the scan data to the scan function which is a basic function.

The memory control unit 404 controls a memory devices such as the RAM 42 and the ROM 43.

Also in the example illustrated in FIG. 9, the storage device 50 is provided outside the main body processor device 30. This is because it is assumed that the main body processor device 30 is implemented by hardware mounted on a main board and that the storage device 50 is implemented by an HDD. However, when it is assumed that the storage device 50 is implemented by a medium other than the HDD, the storage device 50 may be provided in the main body processor device 30 depending on a type of the medium.

Operation of Image Processing Apparatus

Figure 10:
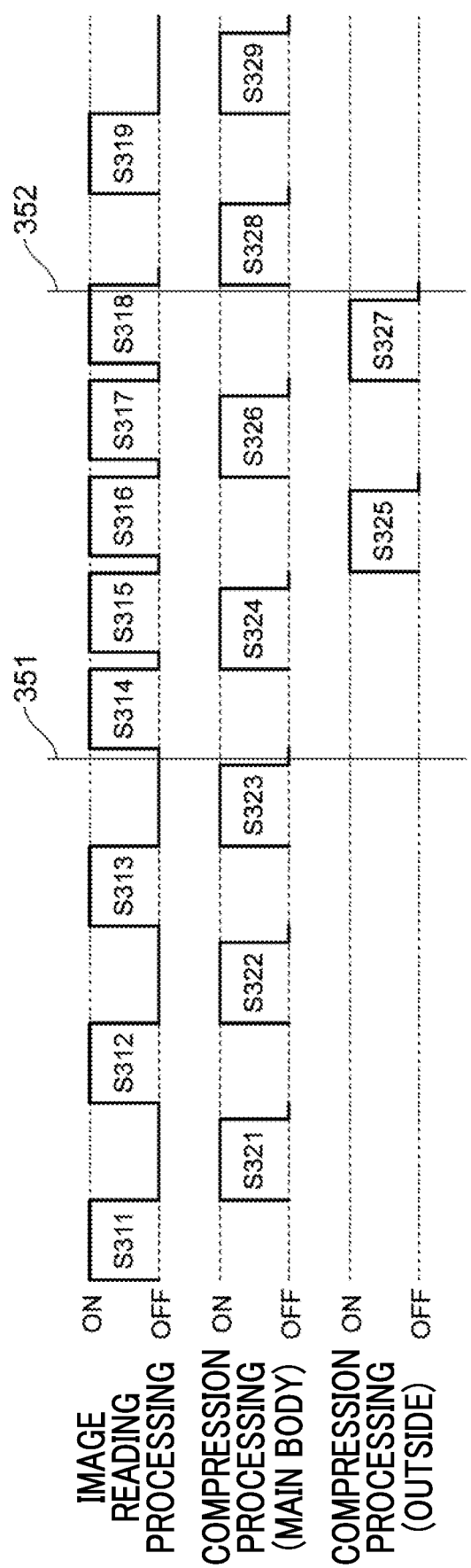
FIG. 10 is a time sequence diagram illustrating an operation example of the image processing apparatus according to the second exemplary embodiment of the present disclosure.

FIG. 10 is a time sequence diagram illustrating an operation example of the image processing apparatus 2 according to the second exemplary embodiment.

In this time sequence diagram, ON and OFF of a sequence of the image reading processing indicate that the image reading processing is being performed and that the image reading processing is not being performed, respectively. ON and OFF of the compression processing (main body) indicate that the compression processing is being performed by the main body processor device 30 and that the compression processing is not being performed by the main body processor device 30, respectively, and ON and OFF of the compression processing (outside) indicate that the compression processing is being performed by the external processor device 40 and that the compression processing is not being performed by the external processor device 40, respectively.

In this operation example, for example, it is assumed that a processing program for performing the compression processing is installed in the main body processor device 30 by connecting the external processor device 40 to the main body processor device 30. Furthermore, in this operation example, it is assumed that the main body processor device 30 performs the scan processing and the print processing simultaneously.

First, it is assumed that the scan processing starts in a state where the external processor device 40 is not connected. Then, the memory control unit 304 in the main body processor device 30 checks whether or not there is a space in the memory such as the RAM 32, and if there is the space, a memory area for capturing an image is secured. The device control unit 305 instructs the device controller 34 to start image reading of an original document by the image reading device 60. The image reading device 60 reads an image of the original document and stores the read image in the memory (step S311).

If the image reading by the image reading device 60 is completed, in the main body processor device 30, the compression processing unit 302 compresses the image stored in the memory and stores the compressed image in the storage device 50 (step S321). If storing the image in the storage device 50 is completed, the memory control unit 304 releases the memory.

If there is a next original document, the memory control unit 304 secures a memory area for capturing an image, and the device control unit 305 instructs the device controller 34 to start image reading of an original document by the image reading device 60. The image reading device 60 reads an image of the original document and stores the read image in the memory (step S312).

If the image reading by the image reading device 60 is completed, the compression processing unit 302 in the main body processor device 30 compresses the image stored in the memory and stores the compressed image in the storage device 50 (step S322). If storing the image in the storage device 50 is completed, the memory control unit 304 releases the memory.

The memory control unit 304, the device control unit 305, the image reading device 60, and the compression processing unit 302 repeat the operations to sequentially perform the scan processing (steps 313 and 323).

Here, it is assumed that the external processor device 40 is in a usable state at timing indicated by a timing line 351. For example, it is assumed that the external processor device 40 is connected or a failure thereof is recovered. Then, the device mounting control unit 301 in the main body processor device 30 detects a connection of the external processor device 40, and determines whether or not the external processor device 40 has spaces of the compression processing unit 402 and the memory. If it is determined that there are the spaces of the compression processing unit 402 and the memory, the device mounting control unit 301 notifies the device control unit 305 that the spaces can be used.

The memory control unit 304 received the instruction from the device control unit 305 checks whether or not there is a memory space in the main body processor device 30, and transmits a determination result to the device control unit 305. If it is determined that there is the memory space in the main body processor device 30 or the external processor device 40, the device control unit 305 instructs the device controller 34 to start image reading of an original document by the image reading device 60. Thereby, the image reading device 60 reads an image of the original document and stores the read image in the memory (step S314).

If the image reading by the image reading device 60 is completed, the compression processing unit 302 in the main body processor device 30 compresses the image stored in the memory and stores the compressed image in the storage device 50 (step S324). If storing the image in the storage device 50 is completed, the memory control unit 304 releases the memory.

In this case, if there is a next original document, the memory control unit 404 in the external processor device 40 secures a memory area for capturing an image without waiting for the memory control unit 304 to release the memory, and the device control unit 305 in the main body processor device 30 instructs the device controller 34 to start image reading of the original document by the image reading device 60. The image reading device 60 reads an image of the original document and stores the read image in the memory of the external processor device 40 (step S315).

If the image reading by the image reading device 60 is completed, the compression processing unit 402 in the external processor device 40 compresses the image stored in the memory and stores the compressed image in the storage device 50 (step S325). If storing the image in the storage device 50 is completed, the memory control unit 404 releases the memory.

The memory control units 304 and 404, the device control unit 305, the image reading device 60, and the compression processing units 302 and 402 repeat the operations to sequentially perform the scan processing (steps 316, 326, 317, 327, 318, and 328).

If the external processor device 40 is not connected, the scan processing is performed after waiting for the memory of the main body processor device 30 to become empty, but if such a control is performed, a memory of either the main body processor device 30 or the external processor device 40 becomes empty immediately, and as a result, the original document can be read quickly.

Thereafter, it is assumed that the external processor device 40 is in an unusable state at timing indicated by a timing line 352. For example, it is assumed that the external processor device 40 is detached or fails. Then, the image reading and the compression processing returns to the processing prior to the timing line 351 in steps 319 and 329.

In this case, the device control unit 305 determines whether or not there is print processing that can be interrupted. If it is determined that there is the print processing that can be interrupted, the print processing is interrupted, and the used memory is released and redistributed so as to be usable in the scan processing.

Processor

In the present exemplary embodiment, a processor refers to a processor in a broad sense and includes a general-purpose processor (for example, central processing unit (CPU) or the like) and a dedicated processor (for example, graphics processing unit (GPU), application specific integrated circuit (ASIC), field programmable gate array (FPGA), programmable logic device, or the like).

An operation of the processor according to the present exemplary embodiment may be performed not only by one processor but also by plural processors existing at physically separated positions cooperating with each other. An order of the respective operations of the processor is not limited to the order described in the present exemplary embodiment and may be changed.

Program

Processing performed by the image processing apparatuses 1 and 2 according to the present exemplary embodiment is prepared, for example, as an information processing program such as application software.

That is, the information processing program for implementing the present exemplary embodiment is regarded as an information processing program that causes an information processing apparatus to perform (i) a function of acquiring an additional processing program for performing the additional processing in response to a connection of an additional processing apparatus that performs the additional processing for the functions of the information processing apparatus, and (ii) a function of storing the acquired additional processing program in the information processing apparatus.

The program for implementing the present exemplary embodiment can be provided not only by a communication unit but also by being stored in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
determine whether an additional processing program for performing additional processing can be acquired from an additional processing apparatus configured to perform the additional processing for a function of the information processing apparatus; and
store the acquired additional processing program in the information processing apparatus,
wherein:
the processor is configured to, when the additional processing apparatus is unusable, cause the information processing apparatus to perform the additional processing using the additional processing program stored in the information processing apparatus, and
the processor is configured to, when the processor performs a first function that uses the additional processing and a second function that does not use the additional processing in parallel, change an order of the processing such that at least a part of processing constituting the first function is completed prior to the second function.

2. The information processing apparatus according to claim 1, wherein the processor is configured to acquire the additional processing program when the additional processing apparatus is connected.

3. The information processing apparatus according to claim 1, wherein the processor is configured to acquire the additional processing program at a predetermined time point after the additional processing apparatus is connected.

4. The information processing apparatus according to claim 3, wherein the predetermined time point is a time point at which an instruction to perform the additional processing or a function that uses the additional processing is received.

5. The information processing apparatus according to claim 1, wherein the at least part of the processing is processing that uses an object collected from the information processing apparatus by an operator.

6. The information processing apparatus according to claim 1, wherein the processor interchanges an order of the at least part of the processing constituting the first function and the processing other than the at least part of the processing.

7. A non-transitory computer readable medium storing a program that causes an information processing apparatus to execute information processing, the information processing comprising:
- acquiring an application additional processing program for performing additional processing in response to a connection of an additional processing apparatus configured to perform the additional processing for a function of the information processing apparatus; and
- storing the acquired additional processing program in the information processing apparatus;
- when the additional processing apparatus is unusable, cause the information processing apparatus to perform the additional processing using the additional processing program stored in the information processing apparatus;
- when a first function that uses the additional processing and a second function that does not use the additional processing are performed in parallel, change an order of the processing such that at least a part of processing constituting the first function is completed prior to the second function.

8. An information processing apparatus comprising:
- means for acquiring an additional processing program for performing additional processing in response to a connection of an additional processing apparatus configured to perform the additional processing for a function of the information processing apparatus; and
- means for storing the acquired additional processing program in the information processing apparatus;
- means form, when the additional processing apparatus is unusable, causing the information processing apparatus to perform the additional processing using the additional processing program stored in the information processing apparatus, and
- means for, when a first function that uses the additional processing and a second function that does not use the additional processing are performed in parallel, changing an order of the processing such that at least a part of processing constituting the first function is completed prior to the second function.

* * * * *